Patented Nov. 21, 1950

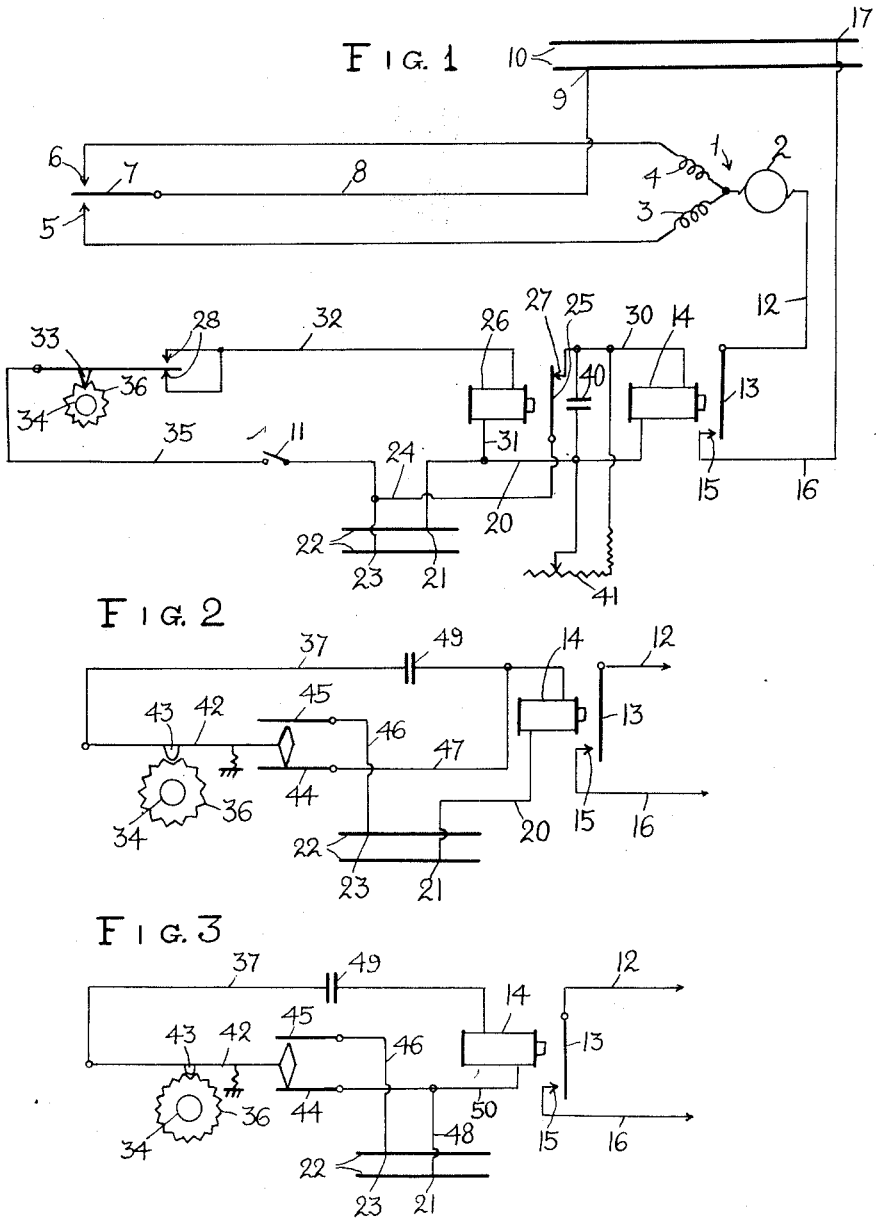

2,530,749

UNITED STATES PATENT OFFICE 2,530,749

CONTROL DEVICE WITH IMPULSE DRIVE

Michel N. Yardeny, Robert Bernas, and Simon A. Goldberg, New York, N. Y., assignors to Consolidated Development & Improvements Corp., a corporation of New York Application March 16, 1946, Serial No. 654,974

2 Claims. (Cl. 318—346)

1

This invention relates to electric control apparatus and has particular reference to apparatus for controlling the rotational speed of an electric motor by periodically interrupting the current supply to the motor.

One object of this invention is to control the speed of an electric motor within wide limits and independently of the characteristics of the motor, by periodically interrupting the current to the motor and varying the rate of the interruptions. Such control apparatus permits to control the positioning of a motor driven load, for instance of a machine tool, in such a manner that the load can be advanced either comparatively rapidly or by small steps for the purpose of placing the load accurately in a desired position. The arrangement according to the invention allows a much more accurate positioning of the load than is possible by using a conventional push button or similar system for energizing or de-energizing the load motor.

Another object of this invention is to supply power to the motor by short impulses independently of the type of the current interrupting device used so that the motor cannot be left in an energized condition.

Another object of this invention is to provide means to control the motor through relay means and a current interrupting device, whereby the motor will receive a constant current supply when the rate of current interruptions in the circuits of the relay means reaches a predetermined limit, so that the motor can be then operated at its normal speed.

The foregoing and other objects and features of this invention are more fully disclosed in the following specification and accompanying drawings in which:

Fig. 1 is a diagrammatic view of an apparatus according to this invention;

Fig. 2 is a fractional diagrammatic view of a modified apparatus;

Fig. 3 is a similar view of another modification.

Figure 4:
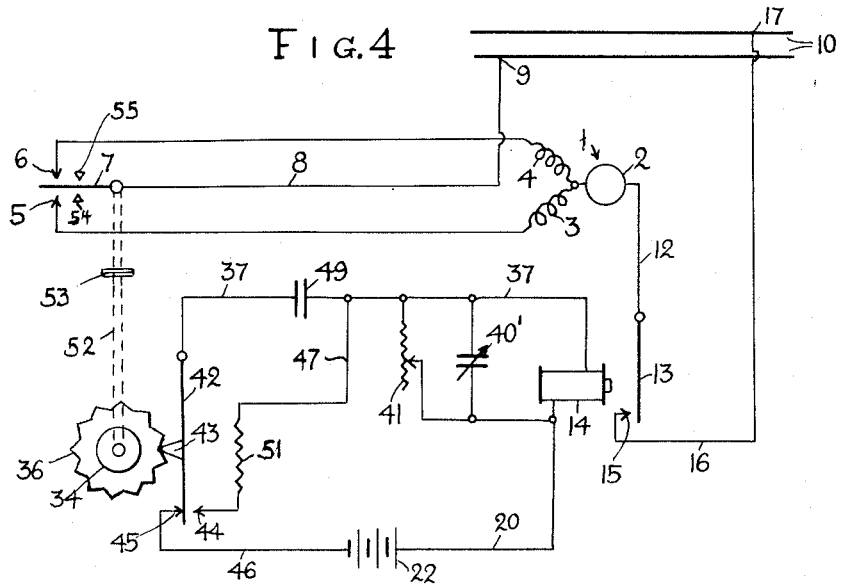
Fig. 4 is a similar view of a third modification.

The control apparatus in one of its embodiments, as shown in Fig. 1, comprises a reversible electric motor 1, with an armature 2, and reversing field windings 3, 4 connected with one terminal of the armature at their joined ends, the other ends being connected to contacts 5, 6 of a reversing switch 7 connected by a lead 8 to one terminal 9 of a source of current 10. The other armature terminal is connected by a lead 12 to the armature 3 of a relay 4. This

2 armature, when attracted by the relay, engages a contact 15 connected by a lead 16 with the other terminal 17 of the source of current. One terminal of the relay 14 is connected by a lead 20 with one terminal 21 of a source of current 22 which may be independent of the source of current 10. The other terminal 23 of the source of current is connected by a lead 24 to the armature 25 of a second relay 26. Armature 25 is normally in engagement with a contact 27 connected by a lead 30 with the other terminal of the relay 14. The armature is disengaged from contact 27 when relay 26 is energized. One terminal of the relay 26 is connected by a lead 31 to the lead 20, and the other terminal of the relay 26 is connected by a lead 32 to contacts 28, alternately engaged by a contact arm 33 of an interrupting or impulse-producing toothed wheel 34. The arm 33 is connected by leads 35, 24 to terminal 23 of the source of current 22.

It should be noted that the reversing switch 7 can be mechanically connected with the manually operable impulse switch 34 so as to control the direction of the motor rotation by rotating the impulse switch to the right or to the left. Impulse switches of this type are more fully described in the co-pending patent application Serial No. 615,673, filed September 11, 1945 now abandoned. The switch is preferably so arranged that the arm 33 always engages one or the other of the contacts 28.

The impulse switch is so constructed that the current to the relay 26 is interrupted every time when one of the teeth 36 engages the contact arm 33, moving the latter from one contact 28 to the other, and is closed when a tooth leaves the arm 33 and until the next tooth engages this arm. Relay 14 thereby receives short impulses of the current, causing the armature 13 to vibrate corresponding to the vibrations of armature 25.

By varying the rate of rotation of the impulse switch 34, it is possible to vary the speed of the motor 1 independently of its inherent speed characteristics, the motor being periodically deenergized and again energized so that its average speed will depend not only on the rate of rotation of the impulse switch but also on its normal rate of acceleration and deceleration under load.

The motor can be also directly connected to the leads 28, 30 disconnecting leads 20, 24 from the source 22 and by connecting lead 20 to lead 12 and lead 24 to lead 16.

For adjusting the length of the current impulses, the first relay 14 is provided with a supplementary circuit comprising a capacitor 40 connected across the terminal of relay 14 and an adjustable resistor 41 similarly connected. As a result of such an arrangement, the relay 14, at a predetermined high rate of interruptions of the current by the second relay 26, will be no longer deenergized between current impulses, and will maintain the armature 13 continuously attracted, thereby holding the motor circuit continuously closed, until the rate of rotation of impulse switch 34 falls below said particular predetermined limit. Relay 26, however, may be adjusted to maintain the circuit open at a high rate of operation of wheel 34.

In a simplified modification, as shown in Fig. 2, a single relay 14 is used, one terminal of the relay being connected by a lead 37 through a capacitor 49 to a vibrating arm 42 of the impulse switch 34 shown as a manually operable toothed wheel which co-acts with a lug 43 on arm 42. Arm 42, when vibrated by rotation of wheel 34, alternately engages contact arms 44 and 45. Arm 45 is connected by a lead 46 to the terminal 23 of the source of current 22 and contact arm 44 is connected by a lead 47 to lead 37.

It will be understood that a system, as shown in Fig. 2 has a definite critical rate of interruptions at which the relay armature 13 will remain attracted and the motor be supplied with uninterrupted current. Above and below this rate the motor current will be periodically interrupted, the rate of interruptions being dependent on the speed of rotation of impulse switch 34. The capacitor 49 limits the current supply to the motor to short impulses, independently of the rapidity of operation of the wheel 34.

In another simplified modification, as shown in Fig. 3, one terminal of relay 14 is directly connected to contact arm 44 by a lead 50 and to the terminal 21 of the source of current 22 by a lead 48. In this arrangement, condenser 49 is discharged through the relay 14, so that the critical rate of interruptions will be lower than in Fig. 2 for the same type of relay. The capacitor 49 in the case also limits the current to short impulses, even if the contact 45 is continuously engaged by the arm 42 in response to one of the teeth 36 engaging arm 42.

In the modification, as shown in Fig. 4, condenser 40, preferably variable, is connected in parallel with relay coil 14, and condenser 49 is connected in series with coil 14 and condenser 40'. Condenser 49 limits the current supply to relay 14 to single impulses of a predetermined limited duration, as was described in connection with the systems of Figs. 2 and 3. A resistor 51 is included in lead 47 to absorb the discharge energy of condenser 49. The discharge of condenser 40' after each current interruption serves to extend the operating time of the relay. At a certain speed of rotation of impulse wheel 34, condenser 40' will maintain the relay 14 continuously energized and the motor will then receive a continuous supply of current.

For controlling direction of the motor rotation, impulse wheel 34 is connected by a shaft 52 with reversing switch 7 through a friction clutch 53. Stops 54, 55 limit movement of switch arm 7 in either direction so that arm 7 will engage one or the other of contacts 5, 6, depending on the direction of rotation of wheel 34.

What is claimed as new and desired to be secured by Letters Patent is:

1. In an apparatus for selectively displacing a load, the combination, with a motor operatively coupled with the load, of a condenser, a charging circuit for said condenser, a discharging circuit for said condenser, a relay serially included in one of said circuits, a normally open energizing circuit for said motor, said relay having contacts adapted to close said energizing circuit when the relay is operated, and switch means selectively operable at a variable rate to close, alternately, said charging and discharging circuits, thereby causing intermittent operation of said relay and displacement of the load at a rate dependent upon the operating rate of said switch means.

2. In an apparatus for selectively displacing a load, the combination, with a motor operatively coupled with the load, of a condenser, a charging circuit for said condenser, a discharging circuit for said condenser, a relay serially included in one of said circuits, a normally open energizing circuit for said motor, said relay having contacts adapted to close said energizing circuit when the relay is operated, a control member selectively rotatable at different speeds, and contacts controlled by said control member and adapted to close, alternately, said charging and discharging circuits a predetermined number of times during each revolution of said control member, thereby causing intermittent operation of said relay and displacement of the load at a rate dependent upon the speed of rotation of said control member.

MICHEL N. YARDENY.
ROBERT BERNAS.
SIMON A. GOLDBERG.

REFERENCES CITED

The following references are of record in the file of this patent:

UNITED STATES PATENTS

| Number | Name | Date |
|---|---|---|
| 1,743,545 | Helpbringer | Jan. 14, 1930 |
| 1,831,735 | Blum | Nov. 10, 1931 |
| 1,885,196 | Gerber | Nov. 1, 1932 |
| 2,173,446 | Heindlhofer | Sept. 19, 1939 |
| 2,262,141 | Holcomb | Nov. 11, 1941 |
| 2,440,228 | Yardeny et al. | Apr. 20, 1948 |
| 2,461,511 | Baecher | Feb. 15, 1949 |